United States Patent Office 3,629,283
Patented Dec. 21, 1971

3,629,283
DERIVATIVES OF DECARBAMOYL MITOMYCIN
Keizo Uzu, Kinichi Nakano, and Toshinaka Takahashi, Tokyo-to, Japan, assignors to Kyowa Hakko Kogyo Kabushiki Kaicha, Tokyo-to, Japan
Filed July 8, 1969, Ser. No. 839,920
Claims priority, application Japan, July 24, 1968, 43/51,866
Int. Cl. C07d 27/36
U.S. Cl. 260—326.3          5 Claims

ABSTRACT OF THE DISCLOSURE

Compounds of the formula

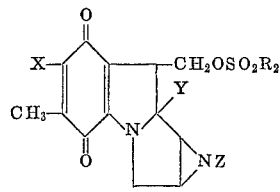

Figure 1:
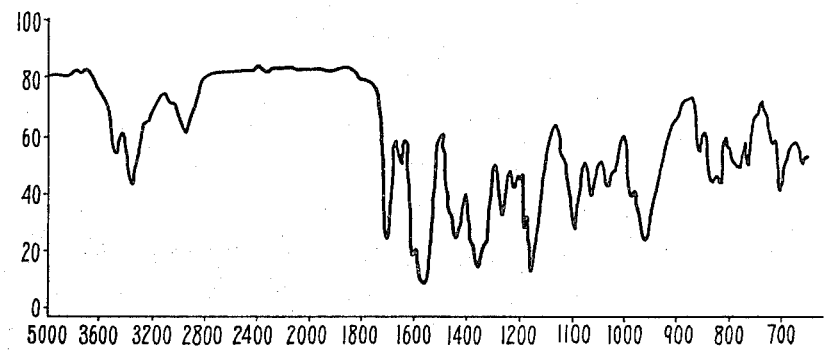

and a process for their preparation are provided wherein X is methoxy or amino, Y is methoxy or hydroxy, Z is methyl or $R_1CO$, $R_1$ is lower alkyl and $R_2$ is lower alkyl or aromatic. These compounds are antibiotics.

BACKGROUND OF THE INVENTION AND DESCRIPTION OF THE PRIOR ART

Mitomvcins of the formula

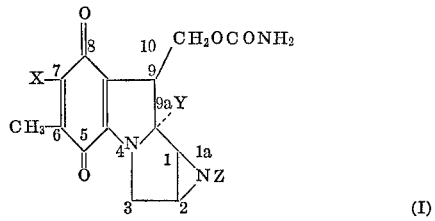

wherein X is methoxy or amino, Y is methoxy or hydroxy and Z is hydrogen or methyl are known antibiotics and, additionally, find use in treating tumors. These mitomycins, however, are strongly toxic and have undesirable side effects.

A process for preparing derivatives of the mitocycins of Formula I of the formula

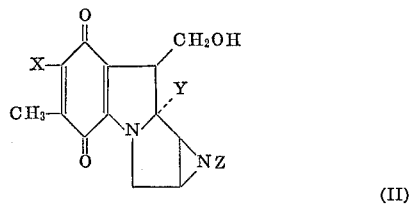

wherein X is methoxy or amino, Y is methoxy or hydroxy and Z is hydrogen or methyl is disclosed in our copending application Ser. No. 814,278, filed Apr. 8, 1969. The compounds of Formula II will generically be referred to herein as decarbamoyl mitomycins. Our copending application Ser. No. 814,278 discloses a process for preparing these decarbamoyl mitomycins wherein a mitomycin of Formula I is reacted with an alkali metal alcoholate in an organic solvent. The alcoholate of a primary, secondary or tertiary alcohol may be employed as a nucleophilic reagent in an organic solvent (e.g., alcohol, tetrahydrofuran, dioxane, dimethylformamide, benzene). The reaction is preferably carried out at ambient temperature. Dry Ice in excess of the quantity necessary to neutralize the solution is added to the reaction mixture to neutralize excess alkali and the reaction mixture is then concentrated in vacuo. The residue obtained after concentration is combined with acetone to extract the reaction product. The extract is concentrated and then purified, for example, by using silica-gel chromatography to obtain crystalline a decarbamoyl mitomycin of Formula II.

A process for preparing derivatives of the mitomycins of Formula II of the formula

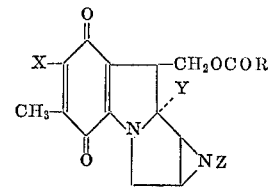

wherein X is methoxy or amino, Y is methoxy or hydroxy, Z is methyl or $R_1CO$ and R and $R_1$ are each lower alkyl is disclosed in our copending application Ser. No. 814,278. These acyl derivatives of decarbamoyl mitomycins of Formula II are prepared by subjecting the decarbamoyl mitomycins of Formula II to acylation to convert the $CH_2OH$ group at the 9-position into a $CH_2OCOR$ group wherein R is lower alkyl. Acylation is conducted by dissolving a decarbamoyl mitomycin of Formula II in a suitable solvent and adding an acid halide or acid anhydride or by condensing a decarbamoyl mitomycin of Formula II with lower carboxylic acid in the presence of a dehydrating condensing agent such as dicyclohexylcarbodiimide. Excess organic base is added to the reaction mixture for the purpose of preventing the decomposition of the reaction product by acid which may be formed during the acylation reaction.

DESCRIPTION OF THE INVENTION

An object of the present invention is the provision of derivatives of the acyl derivatives of decarbamoyl mitomycins of Formula III and a provision of processes for preparing these derivatives. These derivatives are effective antibiotics.

According to the present invention, a compound of the formula

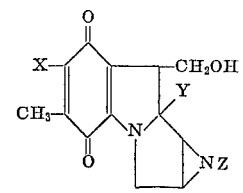

wherein X is methoxy or amino, Y is methoxy or hydroxy, Z is methyl or $R_1CO$ and $R_1$ is lower alkyl is first prepared by subjecting a compound of Formula II to partial acylation or which is conducted in mild condition.

A compound of the formula

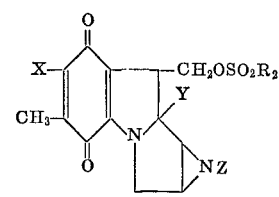

wherein X is methoxy or amino, Y is methoxy or hydroxy, Z is methyl or $R_1CO$, $R_1$ is lower alkyl and $R_2$ is lower alkyl or aromatic is produced by reacting a compound of Formula IV with a sulfonation agent in the presence of a base.

The sulfonation reaction involves the steps of dissolving a compound of Formula IV in a suitable solvent (e.g., water, alcohol, tetrahydrofuran, benzene, pyridine, chloroform, dimethyl formamide) and reacting with a sulfonation agent such as a sulfonic acid halide (e.g., a lower alkyl sulfonic acid halide or a lower alkyl substituted phenyl sulfonic acid halide) in the presence of an excessively large amount of an organic or inorganic base such as sodium bicarbonate at ambient temperature or with ice-cooling. In carrying out the reaction, an excessively large amount of the base should be used in order to prevent the decomposition of the reaction materials by acids which may be produced in the reaction mixture.

The reaction time may vary depending upon the amount of the base used and the property and amount of the sulfonation agent. For example, when tosylation is carried out using p-toluene sulfonic acid chloride in anhydrous pyridine, the reaction mixture should be allowed to stand for a night in a cool room.

The obtained compounds of Formula V have strong antibiotic activity as exemplified in Table 1 and are important as intermediates for the synthesis of various 10-position substituted derivatives.

Table 1 discloses the antibiotic activity of a representative compound of Formula V wherein X is amino, Y is methoxy, Z is as indicated and R is p-methyl phenyl. The table sets forth the minimum concentration of the compound of Formula V in $\gamma$/ml. of solution necessary to inhibit the growth of three representative types of pathogenic bacteria.

TABLE 1

| Bacteria | $Z=CH_3$ | $CH_3CO$ |
|---|---|---|
| *Bacillus subtilis* (ATCC 6633) | 3.125 | 3.125 |
| *Bacillus megatherium* (ATCC 15177) | 1.562 | 1.56 |
| *Escherichia coli* (ATCC 14948) | >25 | >25 |

The following non-limitative examples illustrate the invention:

Example 1

Preparation of the tosyl derivative of 1a-acetyl decarbamoyl mitomycin C $(X=NH_2, Y=OCH_3, Z=COCH_3$ and

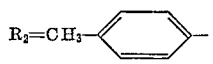

in Formula V):

One hundred (100) milligrams of 1a-acetyl decarbamoyl mitomycin C ($X=NH_2$, $Y=OCH_3$ and $Z=COCH_3$ in Formula IV) were dissolved in 5 ml. of anhydrous pyridine and combined with 100 mg. of p-toluene sulfonyl chloride. The mixture was allowed to stand for a night at 5° C. After this, the reaction mixture was combined with ice water and then combined with an excess amount (5 g.) of sodium bicarbonate. Subsequently, the aqueous solution was extracted with ethyl acetate and the extract was washed several times with saline-saturated water (35%). The extract was dehydrated with anhydrous sodium sulfate and was filtrated. The filtrate was concentrated in vacuo to dryness. The resultant powder gave a single spot and had the infra-red spectrum shown in FIG. 1.

EXAMPLE 2

Preparation of the tosyl derivative of 1a-methyl decarbamoyl mitomycin C ($X=NH_2$, $Y=OCH_3$, $Z=CH_3$ and

Figure 2:
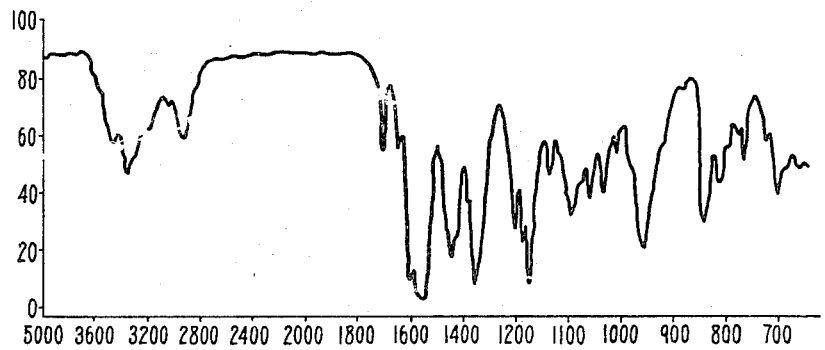

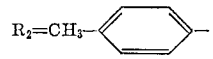

in Formula V):

One hundred (100) milligrams of decarbamoyl porifiromycin ($X=NH_2$, $Y=OCH_3$ and $Z=CH_3$ in Formula IV) were dissolved in 5 ml. of anhydrous pyridine and combined with 100 mg. of p-toluene sulfonyl chloride. The mixture was allowed to stand for a night at 5° C. An after-treatment was carried out in a similar manner to that described in Example 1. The infrared spectrum of the obtained product is shown in FIG. 2.

EXAMPLE 3

Preparation of the methane sulfonyl derivative of 1a-methyl decarbamoyl mitomycin C ($X=NH_2$, $Y=OCH_3$, $Z=CH_3$ and $R=CH_3$ in Formula IV):

One hundred (100) milligrams of decarbamoyl porifiromycin were disoslved in 5 ml. of anhydrous pyridine and combined with 60 mg. of methane sulfonyl chloride. The mixture was allowed to stand for a night at 5° C. An after-treatment was carried out in a similar manner to that described in Example 1.

EXAMPLE 4

Preparation of the tosyl derivative of decarbamoyl mitomycin B ($X=CH_3O$, $Y=OH$, $Z=CH_3$ and

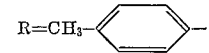

in Formula V);

Decarbamoyl mitomycin B ($X=CH_3O$, $Y=OH$ and $Z=CH_3$ in Formula IV) was treated in a similar manner to that described in Example 1 to give the tosyl derivative of decarbamoyl mitomycin B.

We claim:
1. A compound of the formula

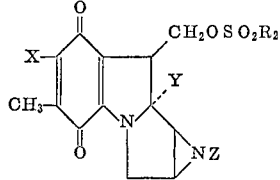

wherein X is methoxy or amino, Y is methoxy or hydroxy, Z is methyl or $R_1CO$, $R_1$ is lower alkyl and $R_2$ is lower alkyl or a lower alkyl substituted phenyl group.

2. The compound of claim 1 wherein X is amino, Y is methoxy, Z is $R_1CO$, $R_1$ is methyl and $R_2$ is p-methyl phenyl.

3. The compound of claim 1 wherein X is amino, Y is methoxy, Z is methyl and $R_2$ is p-methyl phenyl.

4. The compound of claim 1 wherein X is amino, Y is methoxy, Z is methyl and $R_2$ is methyl.

5. The compound of claim 1 wherein X is methoxy, Y is hydroxy, Z is methyl and R is p-methyl phenyl.

References Cited

Nollery: Chemistry of Organic Compounds (1965), pp. 314–15.

ALEX MAZEL, Primary Examiner

J. A. NARCAVAGE, Assistant Examiner

U.S. Cl. X.R.

260—326.5 (B), 999